(12) United States Patent
Keene et al.

(10) Patent No.: US 9,147,284 B2
(45) Date of Patent: Sep. 29, 2015

(54) SYSTEM AND METHOD FOR GENERATING A COMPUTER MODEL TO DISPLAY A POSITION OF A PERSON

(75) Inventors: Richard Moyer Keene, Park City, UT (US); Milne Thomas Crouch, West Jordan, UT (US); Daniel Carl Maxwell, West Valley City, UT (US); Stephen Kent Garland, Salt Lake City, UT (US)

(73) Assignee: Myles L. Strohl, Naples, FL (US)

( * ) Notice: Subject to any disclaimer, the term of this patent is extended or adjusted under 35 U.S.C. 154(b) by 692 days.

(21) Appl. No.: 12/898,656

(22) Filed: Oct. 5, 2010

(65) Prior Publication Data

US 2011/0249008 A1 Oct. 13, 2011

Related U.S. Application Data

(60) Provisional application No. 61/248,763, filed on Oct. 5, 2009.

(51) Int. Cl.
*G06T 15/00* (2011.01)
*G06T 17/05* (2011.01)
*G06T 19/20* (2011.01)

(52) U.S. Cl.
CPC ............... *G06T 17/05* (2013.01); *G06T 19/20* (2013.01)

(58) Field of Classification Search
CPC ......... G06T 19/00; G06T 17/05; G06T 19/20; G06T 15/00; G06T 17/00; G06T 17/20; G06T 17/5004
USPC .......................................... 345/419, 633, 441
See application file for complete search history.

(56) References Cited

U.S. PATENT DOCUMENTS

| 5,448,696 | A | * | 9/1995 | Shimada et al. ............... 715/853 |
| 5,754,189 | A | | 5/1998 | Doi et al. |
| 6,658,136 | B1 | | 12/2003 | Brumitt et al. |
| 2002/0032546 | A1 | * | 3/2002 | Imamura et al. ................. 703/1 |
| 2008/0062167 | A1 | * | 3/2008 | Boggs et al. ................. 345/419 |
| 2009/0131012 | A1 | * | 5/2009 | Ashley et al. ............. 455/404.2 |

FOREIGN PATENT DOCUMENTS

KR 10-2004-0094984 11/2004

OTHER PUBLICATIONS

PCT Application PCT/US2010/051543; filed Oct. 5, 2010; Richard Keene; International Search Report mailed Jul. 8, 2011.

\* cited by examiner

*Primary Examiner* — Ke Xiao
*Assistant Examiner* — Kim-Thanh T Tran
(74) *Attorney, Agent, or Firm* — Thorpe North & Western LLP (57) ABSTRACT

Generating a computer model to display a position of a person in a defined location is disclosed. A method includes the operation of selecting a substantially overhead image of a defined location having spatial coordinates. A perimeter of the defined location is marked using a graphical user interface. The marked perimeter is related to the spatial coordinates of the defined location. A computer model of the defined location is generated based on the marked perimeter. Multiple levels can be added to the computer model. Spatial coordinates of the person can be determined. The position of the person can be displayed relative to the computer model of the defined location based on the spatial coordinates of the person relative to the spatial coordinates of the defined location.

20 Claims, 6 Drawing Sheets

SYSTEM AND METHOD FOR GENERATING A COMPUTER MODEL TO DISPLAY A POSITION OF A PERSON

BACKGROUND

The ability to accurately track and locate personnel can be critical to a mission's success or failure. Mission commanders leading an emergency response team are often limited in their ability to determine where critical assets are located, including human assets that have been dispatched into the field. Certain technologies have been developed that can enable tracking of assets. Tracking can be achieved through the use of continuous radio frequency communications, such as global positioning satellite (GPS) systems, or other types of radio frequency triangulation systems.

In situations where radio frequency reception may be spotty, or non-existent, the radio frequency tracking of human assets can be supplemented by deduced reckoning techniques that can be used to provide substantially accurate positional information to enable mission commanders to make more informed decisions in time critical situations.

However, even the most accurate tracking technologies are of little use without the ability to display a location of the assets in the field. In certain situations, displaying a location of assets may be reasonably straight forward. For example, when a three dimensional computer model of a building has been previously designed, the model can be used to show a location of the assets within the building. At some point in the future, first responders such as police and firemen may have accurate three dimensional computer models of most buildings in their coverage area. However, at the present time, the existence of such pre-existing three dimensional computer models for most buildings in a city is sporadic at best. This lack of pre-existing three dimensional computer models can diminish the effectiveness of the use of tracking technologies for first responders.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

The term "first responder" is used throughout the specification to describe an emergency response person, such as a fireman, policeman, paramedic, or other type of emergency response personnel. The invention, as defined in the claims, is not limited to use in emergency responses. A wide number of different applications may be used in conjunction with the systems and method disclosed and claimed herein, including using the system for practice scenarios.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Example Embodiments

One challenge with the increasing amount of digital information that is available today is to enable an end user to quickly digest and understand the information. In a large emergency response, a mission commander may have dozens of first responders allocated to a selected location. The ability to accurately track human assets involved in emergency missions and other first response scenarios can significantly enhance a mission leader's ability to make decisions that will increase the probability of success of the mission. However, the leader's decisions are limited by the ability to visualize and comprehend the data coming in from the field. If no model exists for an emergency response location, the data provided by the tracking technologies may be of little use.

When a computer model of an emergency response location does not exist, a substantially accurate model must be created within a reasonable amount of time to be of any use to first responders. The ability to rapidly create a three dimensional computer model can enable tracking technologies to be widely adopted by first responders. If a substantially accurate model can be created for a selected location within the first minutes of an emergency, tracking technologies can be used to display a location of first responders within the location. The ability to display near-real time, substantially accurate positional information of first responders can enable first response commanders to make more informed decisions in time critical situations, thereby improving the safety and effectiveness of the first responders.

Figure 1:
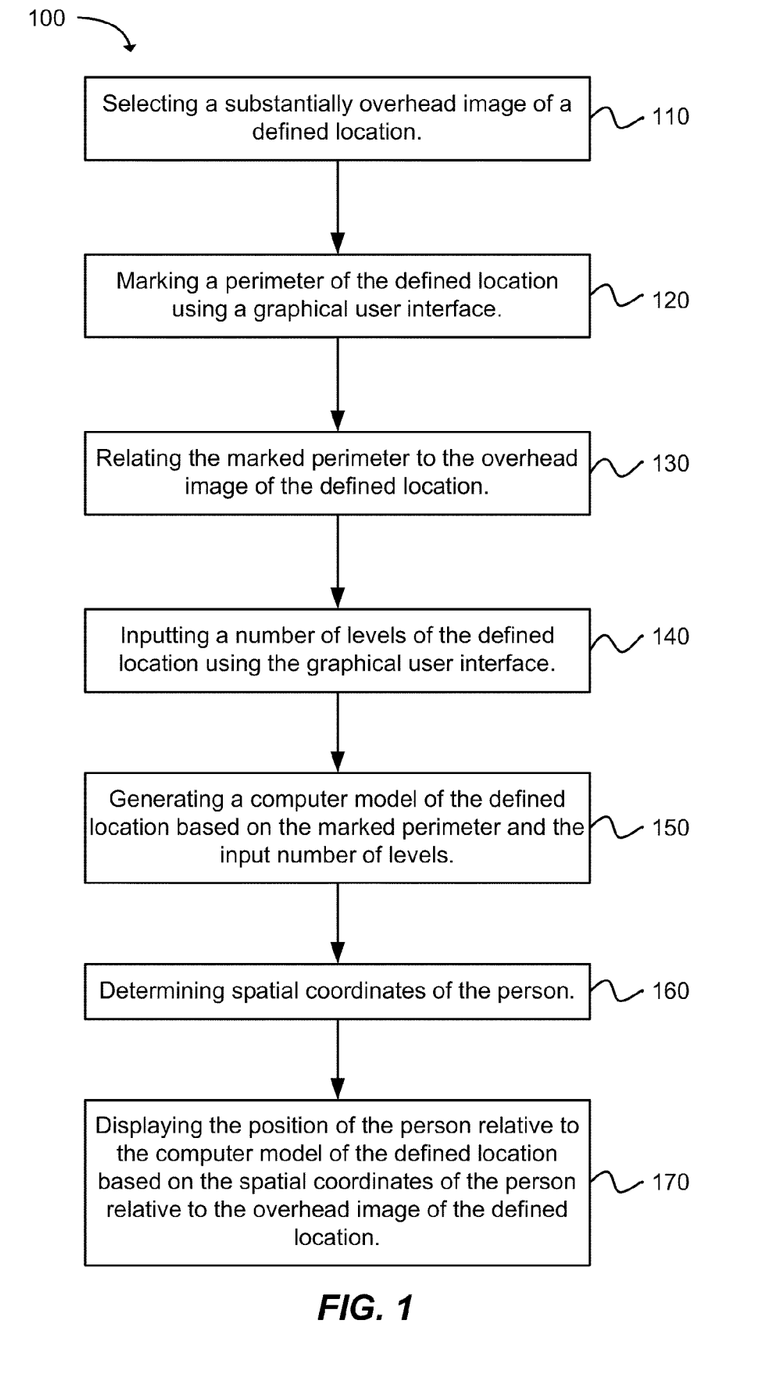
FIG. 1 is a flow diagram of a method for generating a computer model to display a position of a person in a defined location in accordance with an embodiment of the present invention.

In accordance with one embodiment of the present invention, FIG. 1 depicts a flow chart of a method 100 for generating a computer model to display a position of a person in a defined location. The method includes the operation of selecting 110 a substantially overhead image of a defined location having spatial coordinates. Overhead images having spatial coordinates are now available on web servers accessible over the internet for a substantial number of locations throughout the world. For example, web mapping services are provided by Google, Microsoft, and others. A first responder can merely enter an address of an emergency location on a web mapping service available on the internet to view an overhead image of the defined location. First responders may also have overhead images, such as aerial images or satellite images, of the area in which they are responsible, saved in an enduring format such as on an optical disk or a magnetic hard drive. This can enable access to the mapping information even when no internet access is available.

The spatial coordinates of each defined location can typically be determined using web mapping or stored images, wherein the spatial coordinates of each location is provided by the web map or image. However, it is also possible to use an overhead image that does not contain any spatial coordinate information. The spatial information can then be entered based on the predetermined spatial coordinates of the location, or measured spatial coordinates made by first responders upon their arrival at the location. In the event that the spatial coordinates of the defined location are not accurate, the coordinates of the defined location can be updated based on measurements made by the first responders after arriving at the location.

Once an overhead image has been obtained, a perimeter of a defined location in the overhead image can be marked 120 using a graphical user interface, as depicted in the flow chart of FIG. 1. The graphical user interface is configured to enable a user to select locations along the perimeter of the defined location. For example, the defined location may be a building. The user can select locations along the perimeter, such as the corners of the building, to mark the perimeter of the building. The marked perimeter can then be related 130 to the spatial coordinates of the defined location. The spatial coordinates can be based on the latitude, longitude, and altitude of the defined location. Alternatively, another type of spatial coordinate system, such as the United States National Grid spatial referencing system can be used.

In one embodiment, a user, such as a first response commander, can input 140 a number of levels of the defined location using the graphical user interface. For a multi-story building, the user can input the number of stories in the building. The user can also identify which levels are above ground and which levels may be below ground. Knowledge of which personnel are above ground and which are below ground can be critical to a first response commander in situations where personnel need to be quickly recalled or retrieved.

A computer model of the defined location can be generated 150 based on the marked perimeter and the number of levels. Spatial coordinates of one or more first responders sent to the defined location can be determined 160. Each first responder can wear a position determination system. The position determination system can be a global positioning system receiver, a terrestrial based radio frequency triangulation system, or a deduced reckoning system. One or more systems, such as a GPS receiver and a deduced reckoning system, can be used together to improve the accuracy of information regarding the location of each first responder. This information can be transmitted to a command and control center. The command and control center may be as simple as a portable computing device used by a first response commander, or as complex as a dedicated building designed as a command and control center.

The method 100 further includes the operation of displaying 170 the position of the first responder relative to the computer model of the defined location based on the spatial coordinates of the person relative to the spatial coordinates of the defined location. The first responder and the computer model can be displayed together on any type of computer display, such as a portable computing device, a laptop, a desktop, a television display, or using a digital projector to display the image on a screen. The location of each first responder relative to the computer model of the defined location can be displayed using predetermined icons to enable rapid visual identification of each responder. This will be discussed more fully below.

In another embodiment, computer readable instructions can be located on one or more computer readable media which, when executed by one or more computer processors, cause the one or more processors to implement a method for generating a computer model displaying a position of a person in a defined location.

Figure 2A:
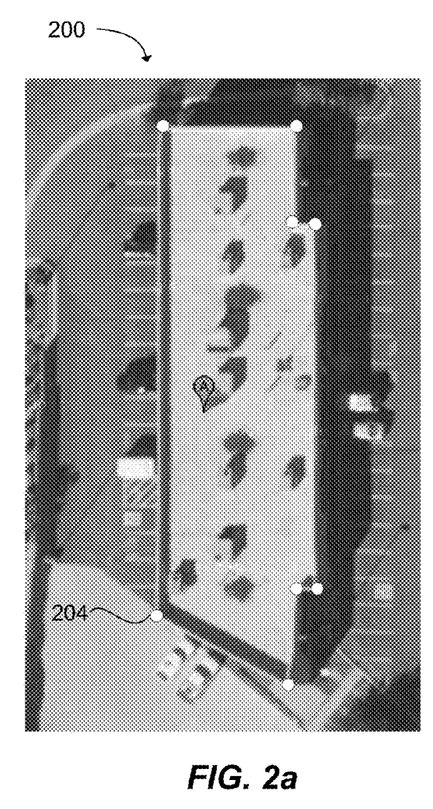
FIGS. 2a and 2b are illustrations of aerial views of defined locations that can be used to form a computer model in accordance with an embodiment of the present invention.
Figure 2B:
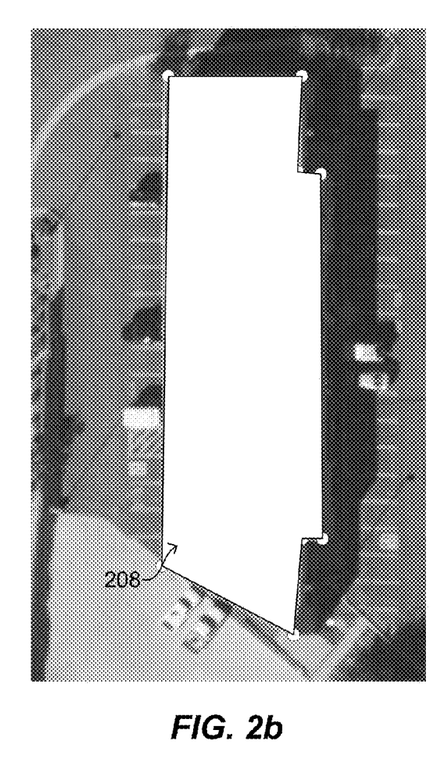

In one embodiment, a first responder can quickly create an adequate computer model of substantially any building or location by accessing an aerial view of a defined location using a web mapping service, defining the perimeter of the building or location by selecting the corners, and entering the number of levels of the location. For example, FIG. 2a shows a typical aerial view 200 of a selected location that is available through Google Maps. Markers 204 can be added to each corner of the building shown in FIG. 2a using a graphical user interface to identify the perimeter of the desired location. The geo-location of the markers can be determined based on the spatial coordinates of the image obtained from the web mapping service. Knowledge of the perimeter can be used to form a model 208 of the defined location, and the spatial coordinates of the defined location, as shown in FIG. 2b. This information can then be used to track the first responder's position relative to the defined location.

Figure 3:
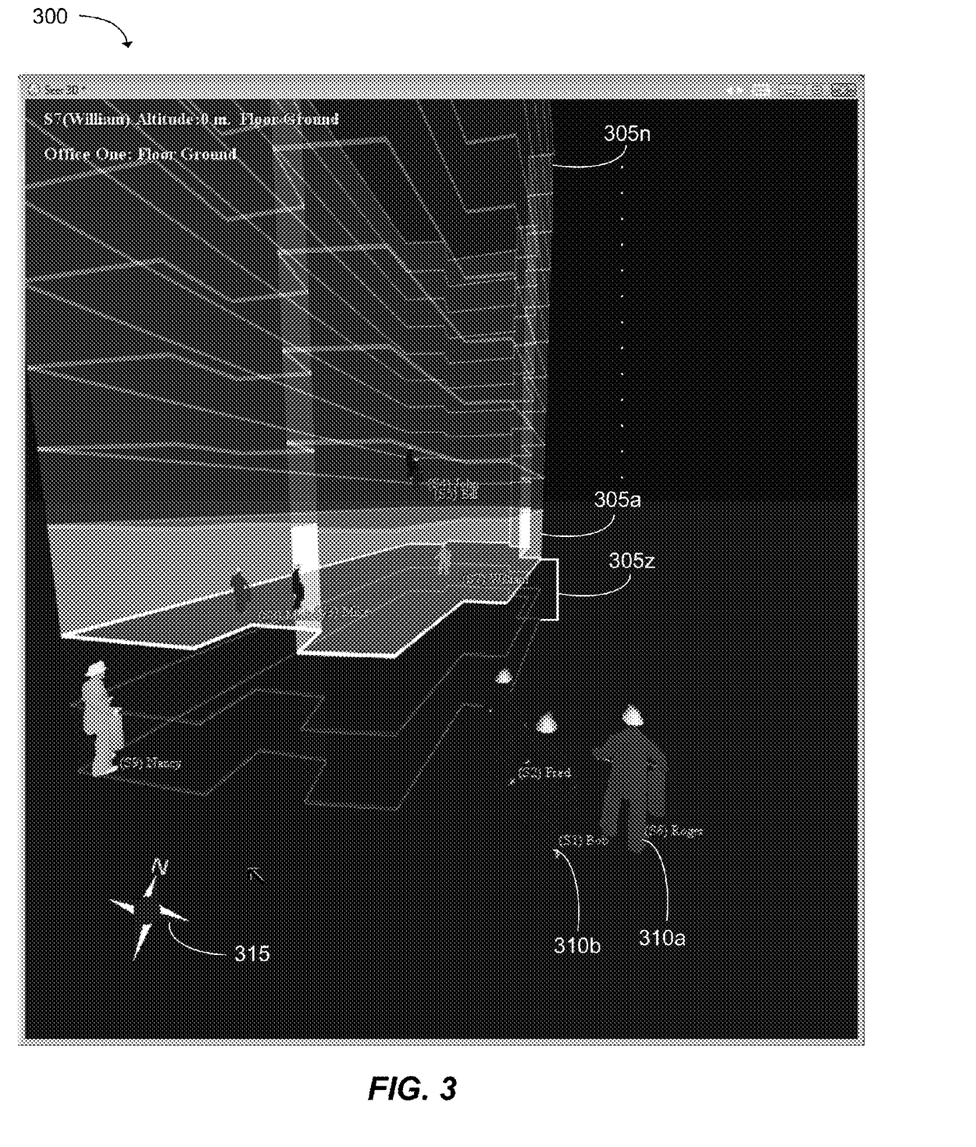
FIG. 3 is an illustration of a graphical user interface used to display a computer model formed for a defined location, with the inclusion of an icon or avatar representing a first response personnel's' location with respect to the computer model in accordance with an embodiment of the present invention.

FIG. 3 shows another embodiment of a computer model 300 of a defined location that was generated with knowledge of a perimeter identified from an aerial view of the defined location. In this embodiment, the user identified that the defined location had a plurality of levels 305a-305n, including two subterranean levels 305z shown in red. An entry level floor 305a is identified and illustrated in white. In this example embodiment, a plurality of first responders 310a, 310b are represented with icons shaped as firemen. The identity of each of the first responders can be shown next to the icon representing each of the first responders. The location of each first responder in the building, and outside the building, can be quickly identified. Firemen in a first group can be identified with green firemen icons 310a. Firemen in a second group can be identified with blue firemen icons 310b. Individuals with different skills can be identified with an icon designed to represent their skill. For example, a paramedic icon, a police officer icon, and so forth can be used. In addition, different icons can be used to show the status of members of the group. For example, a person that has been sent into the field and becomes hurt or injured can press a button on his or her tracking device that will immediately display an injured icon, along with his or her current position, on the computer model of the defined location shown in the graphical user interface.

Avatars can also be displayed on the computer model shown in a graphical user interface rather than merely displaying simple static icons to represent persons in the field. An avatar is an interactive icon that can be controlled based on the actions, movement and motions of the individual or object the avatar represents. The use of avatars to represent persons in the field can provide additional information that enables better decision making. A field commander can more quickly and accurately understand the locations of selected persons in the field. For example, the field commander may want to use a particular person with a specific skill for a selected task. The commander can quickly locate the person by visually discerning the location of the person's avatar on the graphical user interface.

In addition, avatars can display more complex information. Different colors or images of the avatar can be used to convey health and environmental status. Also, the displayed avatar can be animated to represent the actions of the associated person. When the person is running, the avatar can be shown running. If the person is stooping or crawling, the avatar can be shown in a similar status. A field commander can quickly discern certain conditions in the field by viewing the animated actions of the associated avatars. For example, if all of the avatars located on a specific floor of a burning building are suddenly shown stooping and crawling, the field commander can quickly discern that there may be a flare up on that floor, and take immediate action based on the display of the avatars, thereby reducing the time needed to react and potentially saving lives.

Additional icons can be added to the model of the defined location by a user. Icons representing building structures can be added to provide additional information between the first response command and the first responders assigned to the defined location. These icons can include doors, water hookups, fire extinguishers, stair ways, and elevators. First responders entering the building can be used to identify the location of these structures, allowing a user at command and control to add the icons in the proper location. Structures that continue through multiple floors, such as stairways and elevators, can be quickly added at the same location to each floor, or multiple floors, as the case may be, by identifying the number of levels, such as "all" on which the icons should be illustrated at that location. In addition, hazards within the building can be noted by first responders and added to the computer model by adding selected icons to the appropriate location. For example, the location of a fire or a chemical spill may be identified by placing an icon at the appropriate location. Locations of survivors, hostages, or other individuals can also be identified and noted using icons to allow rescue teams to be directed to quickly locate the individuals.

The user can pan and zoom around the three dimensional computer model of the building to see the building from different angles and levels (i.e. heights). A compass indicator 315 is used to show north to enable the user to link the model with its spatial surroundings and guide the first responders inside the building. In addition, a three dimensional view of the path taken by each first responder can be turned on or off in the graphical user interface, to enable the first response commander to have a knowledge of the route taken by each first responder in relation to the three dimensional model of the building. This knowledge can be useful when extracting a first responder, or identifying hazards reported by a first responder.

A log can be stored of the movements made by each first responder assigned to the defined area, as shown in the model. Comments can be entered by a user which can also be recorded in the log in near real time. The comments may be related to one or more selected first responders, or related to conditions or events related to the emergency. For example, a user may comment when a new team of firefighters arrived and entered the building. The log can be useful in real time, as well as after the fact. The log may be used to reconstruct accidents, and provide training based on the movements of the first responders. Along with the log, the model created of the defined location can be saved for future use or reference. The entire history of the event can be recorded, showing the paths that the first responders traveled through the defined area, the events that occurred and were recorded, and so forth. The history can also be played back in reverse. For example, a commander can play back the recorded history in reverse to see the path that each first responder took to get to their present location. Such knowledge can be useful to allow additional first responders to get to a selected path, or to find selected locations that a first responder viewed on his way through the building. Models that were previously created can be loaded to allow nearly instantaneous access to the model to enable the location of the first responders to be visualized.

Figure 4:
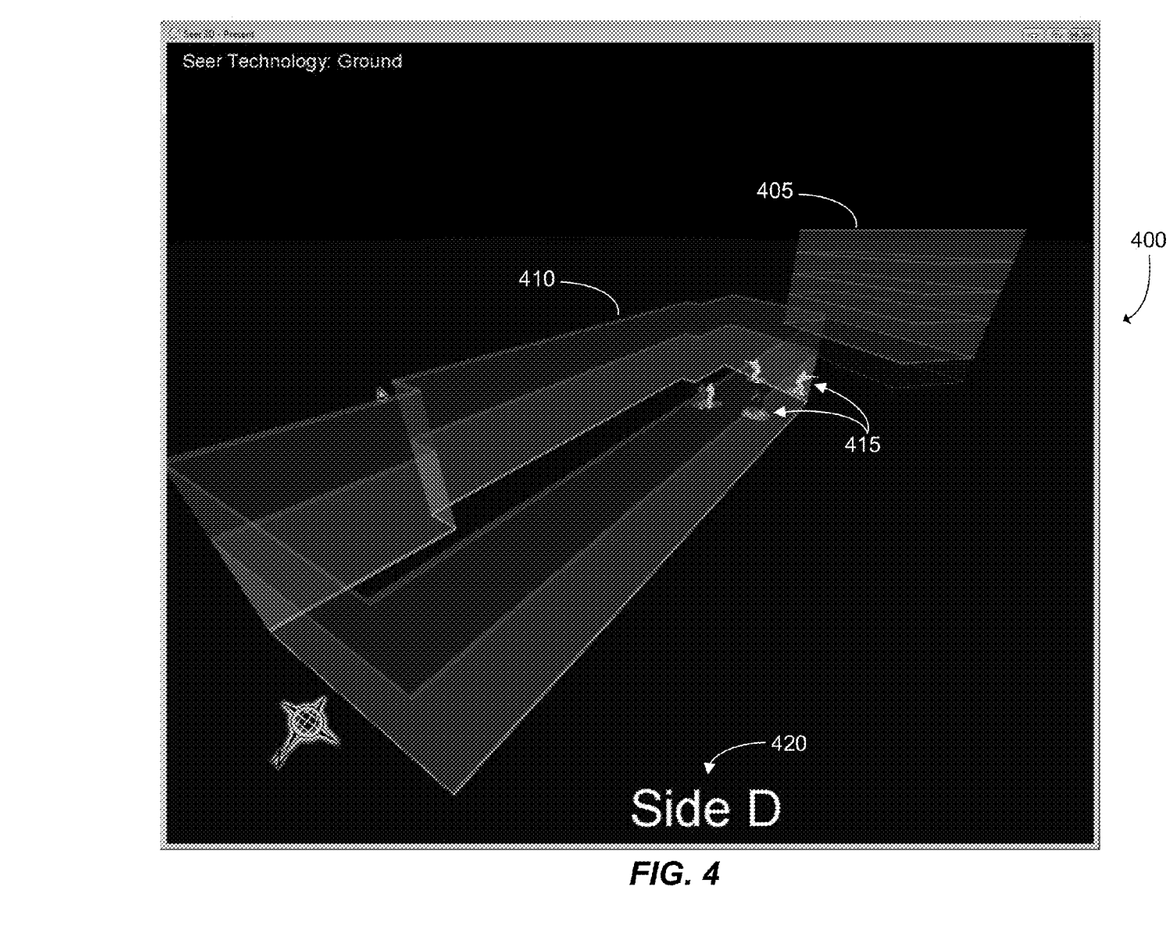
FIG. 4 is an illustration of a graphical user interface showing a plurality of computer models of defined locations formed using an aerial view of the locations in accordance with an embodiment of the present invention.

Additional buildings or locations adjacent to the defined location can also be quickly modeled and represented in the graphical user interface. For example, in a bank heist where multiple robbery suspects have entered a high rise bank building, it may be useful to model not only the bank building, but an adjacent building where snipers may be located. Multiple buildings or locations can be modeled using the same method of selecting a substantially overhead image of the locations, marking the perimeters of the desired locations, and identifying the number of levels of each location. A model of each location can be generated using this information. For example, FIG. 4 shows an example of a graphical user interface 400 showing the models of two buildings 405, 410 located adjacent to one another. The location of first responders 415 can then be accurately represented with respect to the locations. The side of the building currently being displayed can also be labeled and illustrated. For example, FIG. 4 shows that Side D 420 of the building is being shown. Labeling the sides can act as a reference to first responders and first response commanders to enable them to coordinate their desired movements within the building with respect to the model.

Figure 5:
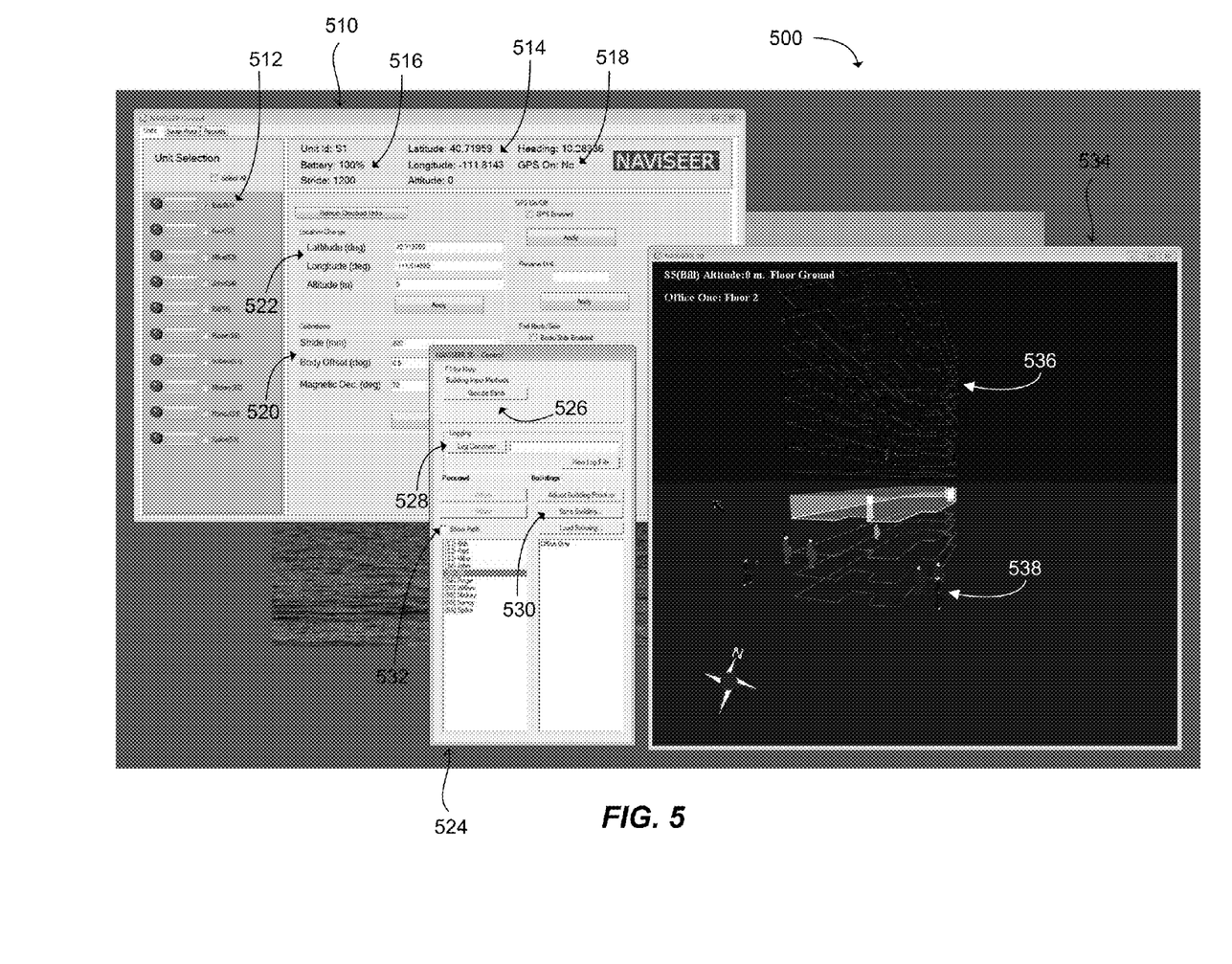
FIG. 5 is an illustration of one example embodiment of graphical user interface screens configured to form, adjust, and control the building model and the icons or avatars representing the first responders in accordance with an embodiment of the present invention.

FIG. 5 provides an illustration of one example embodiment of graphical user interface screens 500 configured to form, adjust, and control the building model and the icons or avatars representing the first responders. The various features previously discussed can be accessed, adjusted, and visualized using the graphical user interface screens, as shown in the example of FIG. 4. The example is not intended to be limiting. A wide range of different graphical user interfaces may be developed to rapidly create a model of a defined location to allow individuals to be tracked in relation to the model of the defined location.

The graphical user interface screens of FIG. 5 can provide various functionalities and capabilities using a single window or screen, or using multiple windows or screens. For example, a control screen 510 can be used to monitor and modify information relating to a person being tracked. A name 512 or representation of the person can be selected to display information 514 such as latitude and longitude, altitude, heading, etc. of the person. The altitude can be relative to the ground at or around the defined location. Other information 516 such as stride length, battery strength of tracking or communication devices, etc. can also be monitored. The control screen can also display whether the person is being tracked by GPS 518 or other means. If the person is carrying devices for tracking via GPS, accelerometer, gyroscope, etc., the control screen can be used to determine or control 520 which, if any, of the devices from which to receive or display tracking information.

The control screen 510 can also enable a user to modify information about the person being tracked. For example, a stride length 520, name of the person being tracked, calibration of equipment, etc. can be modified. Also, if the person being tracked indicates that they are positioned at a specific place within a building and a display screen 534 indicates the person is elsewhere, a user can quickly modify the location to match the information from the person being tracked. The location can be modified either by directly entering latitudinal or longitudinal coordinates 522, altitude, etc. In another example, the location can be modified by entering a building floor number, or a change in distance from the currently displayed location in terms of x, y, or z coordinates, compass directions, or the like. Also, the location can be modified by using a cursor to select and drag an avatar or icon of the person being tracked from the current displayed position to the correct position.

A log screen 524 can be used to create a building model and/or log tracking or modeling data. For example, the user can select a building input method 526 to obtain an image of the defined location from which to identify the perimeter of a building. The log screen can be used to save or load 530 building model after the building model has been created. The log screen can be used to log comments 528 relating to tracked personnel, events, etc., as has been described. Also, the log screen can be used to show a path 532 of a person being tracked or to replay movement or actions of the person being tracked.

A display screen 534 can be used to show the building model 536 and the person 538 or people being tracked. The display screen can be operatively tied to the control screen and log screen such that data input, modifications, etc. on one screen can be reflected in each of the other screens. The display screen can also include icons or tools for panning and zooming of the model. Additional icons or tools can be provided for placing markers at the defined location for building the building model, for modifying the building model, or for modifying a position of a person being tracked with respect to the building model.

Figure 6:
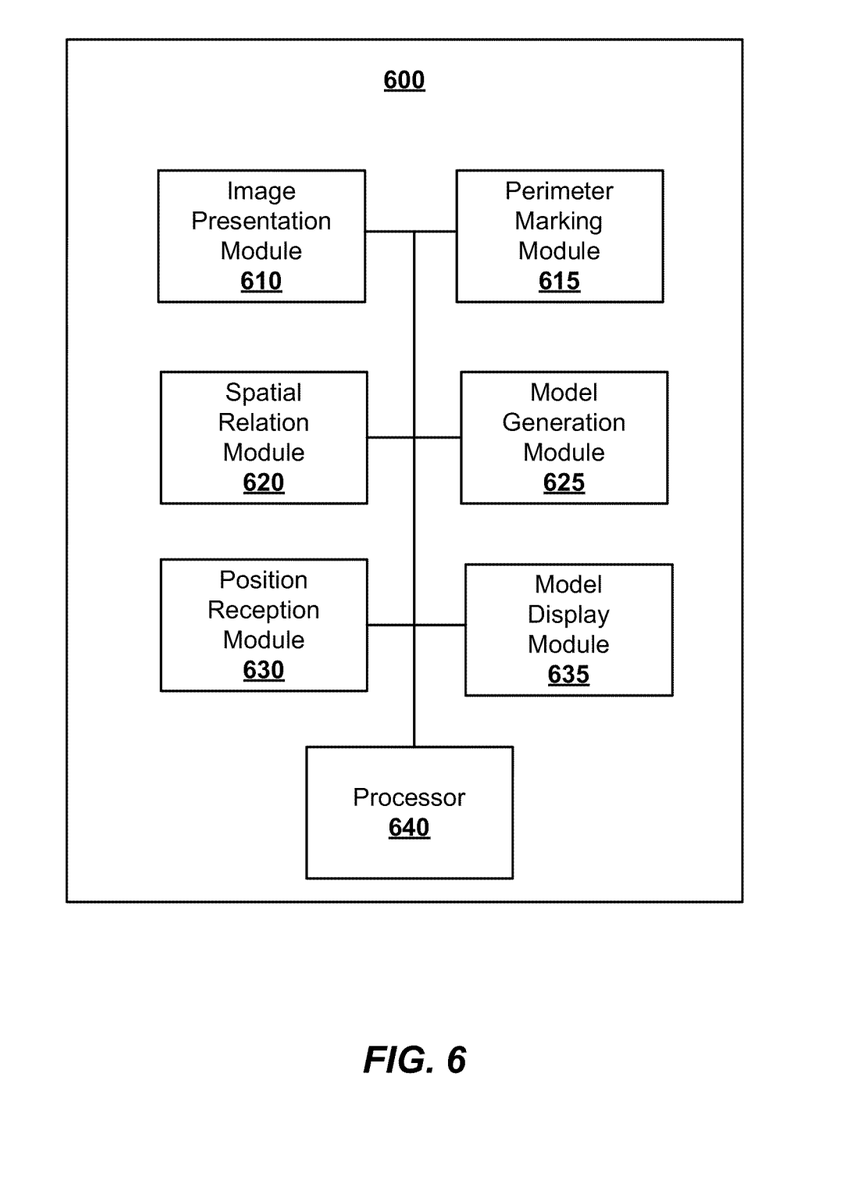
FIG. 6 is a block diagram of a system for generating a computer model displaying a position of a person in a defined location in accordance with an embodiment of the present invention.

Referring to FIG. 6, a block diagram of a system 600 for generating a computer model displaying a position of a person in a defined location is shown. The system includes an image presentation module 610. The image presentation module can display an image of a defined location having spatial coordinates. The image presentation module can also enable a user to select an image for display from a desired image source. For example, the image presentation module can enable a user to select a satellite image from a mapping service for use by the system.

The system can include a perimeter marking module 615. The perimeter marking module can be used to mark selected locations of a perimeter of the defined location. For example, a user can move a cursor to corners or other features of a building, structure, etc. and can select the desired locations for marking the perimeter.

A spatial relation module 620 can relate the selected locations marked on the perimeter of the defined location with the spatial coordinates of the defined location. In other words, spatial coordinates, such as GPS coordinates or the like, can be identified for each of the selected locations marked on the perimeter. The spatial relation module can obtain spatial coordinates or related information from the mapping service, or from information in the image. In another example, GPS or other positional devices can be positioned at the selected locations and the readings of the positional devices can be used to define the spatial coordinates of the selected locations.

The system can include a model generation module 625. The model generation module can form a computer model of the defined location based on the marked locations of the perimeter. The computer model can be a two-dimensional or three-dimensional model and can be navigable in two, three, or four dimensions (the fourth dimension being time). The model generation module can also enable a user to input a number of levels in the defined location to form a three dimensional computer model based on the marked locations of the perimeter and the number of levels.

A position reception module 630 can receive spatial coordinates of a person being tracked. For example, the position reception module can receive positional information from a GPS unit, accelerometer, gyroscope, or other positioning device on or carried by the person. The position reception module can also receive coordinate information changes form the positioning device. In one example, the position reception module can receive specific information relating to the person's actions, such as whether the person is standing up, lying down, walking, crawling, jumping, etc.

The system can further include a model display module 635. The model display module can display the position of the person relative to the computer model of the defined location based on the spatial coordinates of the person relative to the spatial coordinates of the defined location. The model display module can also display an icon relating to the position of the person relative to the computer model, wherein the icon is selected to represent at least one of the person's occupation, the person's team affiliation, the person's health, and an environmental status at the person's location.

The system can further include a processor 640, memory, non-transitory computer readable storage medium, bus, wired and/or wireless network connections, input devices (e.g., keyboard and mouse), display devices, and other communication, processing, or peripheral devices. The various modules described can perform various operations using the processor, memory, and other computing components. The system can further include and/or be connected to a remote server for remotely monitoring the location and/or persons being tracked.

The ability to track emergency personnel at an emergency location has been limited due to the lack of adequate computer models available for emergency locations. The present application discloses a method to quickly create a model of a defined location that can enable modern tracking technology to be used to track and visualize the location of first responders using the model formed of the emergency location. The models can be quickly formed for high rise buildings, low rise buildings, single floor factories, and even underground locations such as mines. The ability to visualize the location of first responders at an emergency location can enhance the capabilities of first responders and mission commanders, while minimizing the risk to the first responders.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A computer-implemented method for generating a computer model to display a position of a person in a defined location, comprising:
   selecting a substantially overhead satellite or aerial image of the defined location having spatial coordinates, the defined location being a physical, geographic location having existing dimensions;
   marking a perimeter outline of a building at the defined location using a processor and a graphical user interface, marking the perimeter outline including selecting corners of the building on the satellite or aerial image with perimeter lines extending between the corners;
   relating the marked perimeter to the spatial coordinates of the defined location, using the processor, by identifying spatial coordinates for portions of the satellite or aerial image corresponding to the corners and defining spatial coordinates of the corners to correspond with the spatial coordinates for the portions of the satellite or aerial image corresponding to the corners;
   inputting a number of levels of the building at the defined location using the graphical user interface;
   generating a computer model of the building at the defined location using the processor, wherein generating the computer model of the building includes generating a shape of the computer model of the building corresponding to the perimeter outline, and wherein generating the computer model of the building includes generating a number of levels of the computer model corresponding to the number of levels of the building;
   determining spatial coordinates of the person using the processor; and
   displaying the position of the person relative to the computer model of the building at the defined location based on the spatial coordinates of the person relative to the spatial coordinates of the defined location.

2. The method of claim 1, wherein generating the computer model further comprises generating a wire frame model showing each level of the building to enable the position of the person to be displayed within the building at a level corresponding to the person's spatial coordinates.

3. The method of claim 1, wherein inputting a number of levels further comprises inputting a number of above ground levels and a number of below ground levels and wherein generating the computer model of the building includes generating the number of above ground levels and generating the number of below ground levels.

4. The method of claim 1, wherein selecting the substantially overhead satellite or aerial image of the defined location further comprises selecting the substantially overhead satellite or aerial image using a web mapping service.

5. The method of claim 1, further comprising selecting the substantially overhead satellite or aerial image of the defined location using a previously recorded image.

6. The method of claim 1, wherein marking a perimeter of the defined location further comprises placing markers at a plurality of the corners of the building at the defined location and connecting the markers to form the perimeter of the defined location.

7. The method of claim 1, further comprising:
   marking a perimeter outline of at least one adjacent building using the graphical user interface;
   generating a computer model of the at least one adjacent building based on the marked perimeter outline; and
   displaying the position of the person relative to the computer model of the building and the at least one adjacent building.

8. The method of claim 1, wherein receiving spatial coordinates of the person further comprises receiving spatial coordinates based on both of a position of a global positioning satellite receiver carried by the person and a position of a deduced reckoning device carried by the person.

9. The method of claim 1, wherein receiving spatial coordinates of the person further comprises receiving spatial coordinates based on a position of a deduced reckoning device carried by the person.

10. The method of claim 1, wherein displaying the position of the person further comprises displaying an icon of the person relative to the computer model of the building, wherein the icon includes a color and a shape selected to represent an identity of the person, including one or more skills of the person.

11. The method of claim 1, further comprising displaying a position of a plurality of persons relative to the computer model by displaying a separate icon showing a location of each of the plurality of persons relative to the computer model of the building.

12. The method of claim 1, further comprising positioning infrastructure icons within the computer model of the defined location to represent locations of infrastructure within the building, the infrastructure being selected from any one or more in the group consisting of: water hookups or fire extinguishers.

13. The method of claim 1, further comprising positioning icons relative to the computer model of the building to represent locations of survivors or hostages relative to the building.

14. The method of claim 1, further comprising storing a log of movements made by the person relative to the spatial coordinates of the defined location and the computer model.

15. The method of claim 14, further comprising storing comments of a user in the log relating to at least one of the person and conditions or events near the defined location.

16. The method of claim 14, further comprising playing back the movements made by the person relative to the spatial coordinates of the defined location and the computer model in an actual scenario in reverse, and determining a path of the person based on playing back the movements.

17. A non-transitory computer-readable medium comprising computer-executable instructions which, when executed by a processor, implement a system for generating a computer model displaying a position of a person in a defined location, comprising:
  an image presentation module configured to display an overhead satellite or aerial image of the defined location having spatial coordinates, the defined location being a physical, geographic location having existing dimensions;
  a perimeter marking module configured to mark selected locations of a perimeter outline of a building at the defined location, the selected locations representing building corners and the perimeter outline extending between the selected locations;
  a spatial relation module configured to relate the selected locations marked on the perimeter of the building at the defined location with the spatial coordinates of the defined location by identifying spatial coordinates for portions of the satellite or aerial image corresponding to the building corners and defining spatial coordinates of the building corners to correspond with the spatial coordinates for the portions of the satellite or aerial image corresponding to the building corners;
  a model generation module configured to form a computer model of the building based on the marked locations of the perimeter, the marked locations of the perimeter defining a shape of the computer model of the building, the model generation module being further configured to generate a number of levels of the computer model corresponding to a number of levels of the building;
  a position reception module operable to receive spatial coordinates of the person; and
  a model display module configured to display the position of the person relative to the computer model of the building based on the spatial coordinates of the person relative to the spatial coordinates of the building.

18. The system of claim 17, wherein the model generation module is further configured to enable a user to input a number of levels in the building to form a three dimensional computer model based on the marked locations of the perimeter and the number of levels.

19. The system of claim 18, wherein the model display module is further configured to display an icon relating to the position of the person relative to the computer model, wherein the icon is selected to represent the person's occupation, the person's team affiliation, and the person's health.

20. A system comprising:
  a processor;
  a non-transitory computer readable storage medium;
  computer readable instructions on the non-transitory computer readable storage medium which, when executed by the processor, cause the processor to implement a method for generating a computer model displaying a position of a person in a defined location, comprising:
  selecting a substantially overhead satellite or aerial image of the defined location having spatial coordinates, the defined location being a physical, geographic location having existing dimensions;
  marking a perimeter outline of a building at the defined location using a graphical user interface, marking the perimeter outline including selecting corners of the building on the satellite or aerial image with perimeter lines extending between the corners;
  relating the marked perimeter to the spatial coordinates of the defined location by identifying spatial coordinates for portions of the satellite or aerial image corresponding to the corners and defining spatial coordinates of the corners to correspond with the spatial coordinates for the portions of the satellite or aerial image corresponding to the corners;
  generating a computer model of the building based on the marked perimeter, wherein generating the computer model of the building includes generating a shape of the computer model of the building corresponding to the perimeter outline, and wherein generating the computer model of the building includes generating a number of levels of the computer model corresponding to a number of levels of the building;
  determining spatial coordinates of the person; and
  displaying the position of the person relative to the computer model of the building based on the spatial coordinates of the person relative to the spatial coordinates of the defined location.

* * * * *